March 27, 1956     R. M. BRYCE     2,739,834
WIND DEFLECTOR FOR VEHICLES
Filed Feb. 9, 1950
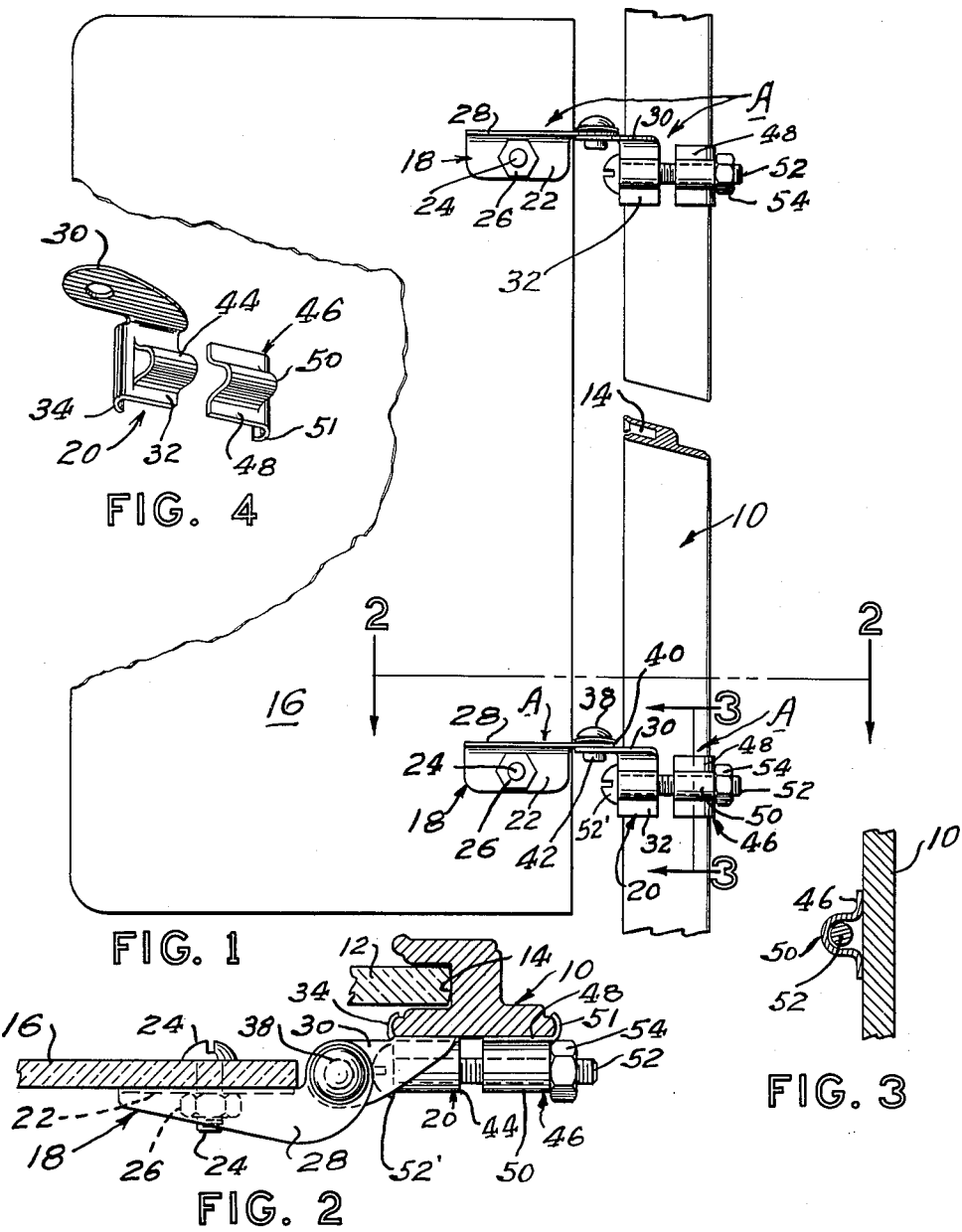
INVENTOR.
ROBERT M. BRYCE
BY Leo F. Larrabee
HIS ATTORNEY

United States Patent Office 2,739,834
Patented Mar. 27, 1956

2,739,834

WIND DEFLECTOR FOR VEHICLES

Robert M. Bryce, Los Angeles, Calif., assignor to Mildred Friend, Los Angeles, Calif.

Application February 9, 1950, Serial No. 143,239

1 Claim. (Cl. 296—84)

My invention relates to wind deflectors for automobiles and is more particularly directed to mounting means for such wind deflectors.

Modern automobiles have bodies, the tops of which are downwardly curved in front and rear, resulting in a triangular space that is generally divided by a channeled vertical member in which the front edges of the main windows are mounted for sliding vertical movement.

The triangular space in front of the vertical member is usually fitted with windows pivoted on a vertical axis so that they may be swung outwardly to serve as side wings or means for causing a desired ventilation of the front end of the car.

However, the outward flow of the air stream over the outwardly projecting window, or side wing, is deflected inwardly by the main air streams flowing along the side of the car, and is forced inwardly into the rear portion of the driver's window, which is normally kept open to enable the driver to make the arm signals required by law.

The present invention is intended to provide a shield auxiliary to the main side wings, and particularly novel mounting means for a shield which is effective to deflect the air streams that otherwise would enter the open front windows of an automobile and which auxiliary deflector is supported by my novel mounting means on the channeled vertical member referred to.

An object of my invention is to provide novel securing or mounting means for a wind deflector by which the deflector may be easily and rigidly mounted in position on the upright channeled vertical member guiding the front edge of an automobile window, but which deflector connected to the novel mounting means, may be readily adjusted to a desired angular position to provide proper deflection of the wind or air stream along the side of an automobile.

A further object of my invention is to provide a wind deflector which may be mounted in a position on the front vertical guiding member of the window of an automobile without the use of studs or screws driven into holes that may be required to be drilled into the vertical member and without requiring the use of special tools to install or adjust the wind deflector on such member.

A still further object of my invention is to provide a novel mounting means for a wind deflector for automobiles, and which is of simple construction, inexpensive to produce, and yet providing for long and trouble-free service after installation; and which novel mounting means is so constructed and adapted to be secured to the front vertical window guiding member in such manner that when the window is closed the wind deflector and its mounting means are entirely enclosed within the automobile, thereby preventing removal of the deflector and its mounting means by unauthorized persons.

Other objects, advantages and features of my invention may appear from the accompanying drawing, the subjoined detail description, and the appended claim.

The accompanying drawing illustrates the invention in a form I at present deem preferable.

Figure 1 is a side elevation of a wind deflector and the mounting means illustrating my new and novel invention.

Fig. 2 is a cross-section on line 2—2, Fig. 1, but drawn on a larger scale.

Fig. 3 is an enlarged cross-sectional view on line 3—3, Fig. 1.

Fig. 4, is a perspective view of the mounting parts, effective to secure the wind deflector in position, on the vertical channeled member of the automobile.

Referring to Fig. 1, the numeral 10 indicates the front vertical channeled member of the frame of the vertically adjustable window glass of an automobile body, and which is of a type in general use by most of the larger automobile manufacturers.

In some models of automobile bodies the member 10 may be somewhat sloped, but the arrangement of the wind deflector may be applied to such sloped front substantially vertical frame members without modification.

In all cases in which a vertical front frame member 10 is used, the front edge of the vertically adjustable window 12 is guided in a groove 14 in the rear edge of the member 10 and the width of the member 10 may vary rather widely between different models of the automobile body; further, the member is usually of quite small cross-section, as is adaptable to the usual thickness of the glass for automobile windows.

Generally, due to the usual construction of automobile windows and frames therefore, it is not practicable to mount a wind deflector on the member 10 by the usual screw mounting means, and to the best of my knowledge no attempt has been made, prior to my invention, to utilize the upright stationary vertical bar or member for affixing an auxiliary wind deflector thereto, and which is securely mounted and enclosed within the automobile when the windows thereof are closed, thereby preventing removal of the same by unauthorized persons if the vehicle is left unattended.

According to my invention, I mount an auxiliary wind deflector 16 which is preferably in the form of a plate of transparent rigid plastic material, by means of a pair of novel adjustable mounting or hinge members generally indicated at A, and which are arranged to clamp securely upon the front and back edges of the vertical member 10 without in any way interfering with the working of the window glass 12 which slides in the groove 14.

The pair of hinge members A are identical and reference numerals are applied to only one hinge structure but are equally applicable to the other hinge member A.

The members A are preferably formed of stampings from medium guage corrosion resistant sheet metal, and comprise a part 18 that is secured to the deflector plate 16 and which part 18 is hingedly connected to, and supported by, a clamp member 20 arranged to be mounted upon one side of the vertical edge of frame member 10.

The part 18 secured to the deflector plate 16 comprises a vertical flange 22 drilled with one or more holes for the passage of threaded studs 24 which serve to clamp the plate 16 and part 18 together when nut 26 is tightened up on stud 24.

A stiffening and strengthening flange 28 is bent outwardly from flange 22, the flange 28 being extended beyond the adjacent vertical front edge of plate 16.

Part 20, clamped on the vertical member 10 consists of a rear or flange member 30 with a vertical flange 32 adapted to lie against the rear side of the inner surface of vertical member 10.

The rearward edge of flange 32, is curved inwardly, as shown at 34 (Figs. 2 and 4) to extend around the rearwardly vertical upright edge of member 10, and the flange 30, is bent to project horizontally from vertical flange 32. Flange 30 is extended beyond the rearward vertical edge of vertical member 10 to overlap flange 28. A hole is drilled through the overlapping portions of flanges 28 and 30 and a threaded stud or rivet 38 is passed through the aligned holes, a dished spring washer 40 preferably being placed between the head of the stud and the surface of flange 28.

The stud 38 forms the hinge pin for the hinge connection between the parts 18 and 20. A nut 42 is threaded on stud 38 and enables a desired degree of friction to be maintained in the hinge joint which will be sufficient to hold the deflector plate 16 in adjusted position notwithstanding the considerable wind pressures acting upon it when the automobile is traveling at a high rate of speed.

Preferably, and as shown in Fig. 2, the portion of flange 28 extending beyond the edge of the deflector plate 16 is curved inwardly, so that the pivotal connection of parts 18 and 20 is positioned adjacent the front edge of the auxiliary deflector plate 16, so as to mount the plate 16 clear of the window 12.

The flange 32 is furnished with an outwardly projecting loop 44, as for instance by forming short vertical cuts spaced from one another and pressing out the material between the cuts, or as shown in the drawings by bending the middle portion along a longitudinal line to form the loop 44.

The clamp member 20 also includes a front clamp or flange member 46 comprising a vertical flange 48 adapted to lie against the front side of the inner face of vertical member 10, and is provided with a loop midsection 50 in alignment with loop 44, and which loop portion 50 is formed in a manner analogous to that of loop portion 44.

The front edge of flange 48 is inwardly curved as shown at 51 to grip the forward vertical edge of member 10.

A threaded stud 52 is positioned to extend through the looped portions 44 and 50, with its head 52' bearing against the end of one looped portion and a nut 54 threaded on the stud bearing against the opposite end of the other looped portion. When the nut 54 is tightened, members 20 and 46 are drawn together and are securely clamped in position on the upright stationary vertical member 10 by securing the inwardly curved edges 34 and 51 of flanges 32 and 48 to the vertical edges thereof.

The upper of the pair of supporting members is arranged similarly to the lower member of the pair above described.

It will be noted that the deflector 16 is firmly secured in adjusted position without the necessity of drilling holes in the window frame members, and requires only a screw driver to install. The deflector affords considerable additional protection from drafts to the driver and occupants of the automobile, even when the automobile is furnished with the usual type of wind deflector arranged ahead of the vertically adjustable window.

The wind deflector of my invention is also inexpensive to produce since all the parts may be produced by die stamping the parts from sheet metal, yet the completed assembly is well adapted to afford satisfactory and trouble-free service and may be installed with advantage on nearly all makes and models of automobile bodies.

While I have described and illustrated a preferred embodiment of my invention, it is to be understood that various modifications of the described embodiment may be made by those skilled in the art without departing from the invention as defined by the appended claim.

I claim:

An auxiliary wind deflector adapted to be mounted upon a substantially vertical window frame bar that separates the main window opening and the side wing opening in the side door of an automobile, and comprising a wind deflector plate; hinge means connecting said plate to said bar including a plate attaching member having a vertical flange bearing against the face of said plate and a horizontal flange extending from said vertical flange and beyond the edge of said plate; means securing said plate to said member; clamp means detachably and adjustably connected to the front and back edges of said bar and including a flange positioned on the inner vertical surface of said bar; a horizontal member extending from said clamp means and underlying said first mentioned horizontal flange; and means pivotally and frictionally connecting said overlying horizontal flanges together whereby said plate may be moved inside the main window opening to permit said opening to be closed and to be moved outside said opening when said window opening is open.

References Cited in the file of this patent

UNITED STATES PATENTS

| | | |
|---|---|---|
| 1,461,095 | Reiner | July 10, 1923 |
| 1,988,016 | Nisbet | Jan. 15, 1935 |
| 2,236,615 | Wheeler | Apr. 1, 1941 |
| 2,242,606 | Duncan | May 20, 1941 |
| 2,608,926 | Helsley | Sept. 2, 1952 |